Aug. 2, 1966 P. MAHMOODI 3,263,485
APPARATUS FOR DETERMINING THERMAL CONDUCTIVITY
Filed Jan. 30, 1964
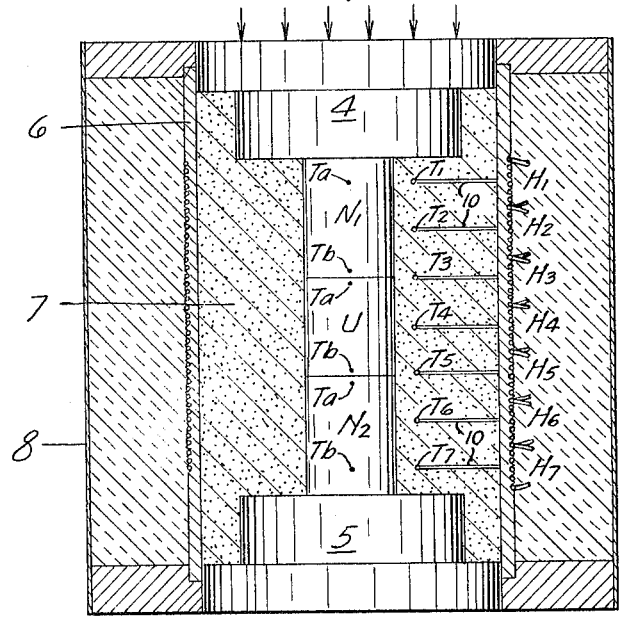
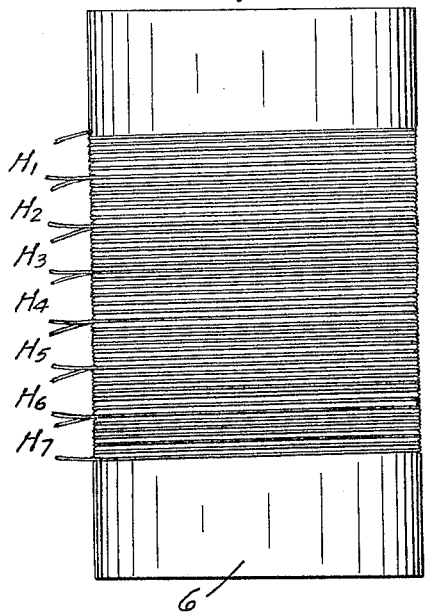
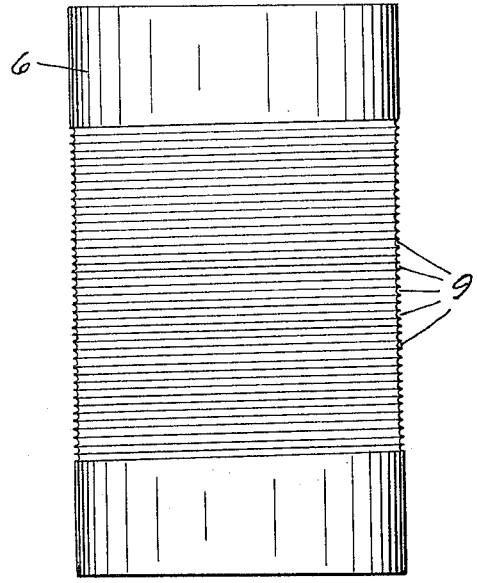
INVENTOR.
PARVIZ MAHMOODI
BY
Carpenter, Abbott, Coulter & Kinney
ATTORNEYS

# United States Patent Office 3,263,485
Patented August 2, 1966

3,263,485
APPARATUS FOR DETERMINING THERMAL CONDUCTIVITY
Parviz Mahmoodi, White Bear Lake, Minn., assignor to Minnesota Mining and Manufacturing Company, St. Paul, Minn., a corporation of Delaware
Filed Jan. 30, 1964, Ser. No. 341,349
6 Claims. (Cl. 73—15)

This invention relates to apparatus for determining thermal conductivity of solid materials by a comparative method.

The principle of the comparative method for determining thermal conductivity is well known. Abutting samples having respective known and unknown thermal conductivity are aligned between a heat source and a heat sink. A temperature differential is established across the samples and the temperature drop within each sample is carefully measured. The comparative temperature drop of the samples is inversely proportional to the comparative thermal conductivity of the samples, and thus a simple ratio formula will determine the thermal conductivity of the unknown.

The results of the above method are dependent on establishing unidirectional heat flow from the source to the sink. Therefore it is important to minimize radial heat transfer between the samples and the surrounding medium and at least one way to accomplish this is to establish a temperature gradient within the said surrounding medium that simulates the temperature gradient within the samples. Accordingly, it is a purpose of the present invention to provide the desired temperature gradient within the medium.

In a preferred embodiment of the present invention a cylindrical guard tube surrounds the heat source, samples and heat sink; and the space between the guard tube and samples is filled with low thermal conductivity ceramic powder which constitutes the mentioned surrounding medium. The guard tube is provided with a series of individually controllable heaters each of which comprises a length of wire that is helically wound around said guard tube. This same general construction is described in an article by J. Francl and W. P. Kingery entitled, "Thermal Conductivity IV, Apparatus for Determining Thermal Conductivity by a Comparative Method," which was published in the Journal of The American Ceramic Society, vol. 37, No. 2, pages 80–84 (1954). However, the present device is differentiated from that described in said publication by the arrangement of the heaters and the means for determining regulation thereof. In the present device, adjacent heaters are positioned very close together with the first winding of one coil spaced from the last winding of the preceding coil a distance substantially equal to the distance between the inner windings of the respective coils. In this way the adjacent end windings lend heating support to each other in the same manner as the inner windings so as to prevent a dip in the temperature profile between the heaters. In the prior device a pronounced spacing is provided between the heaters, and therefore the overall temperature profile along the heaters comprises a series of drops and rises. It follows that the temperature gradient of the medium also comprises a series of drops and rises and thus the temperature of the medium cannot match the temperature gradient of the samples which results in undesirable radial heat transfer.

It will be understood that for practical reasons it is impossible to incorporate enough heaters to control the temperature of the medium at every point along the samples. Thus, when the heaters are arranged close together as taught by the present invention, the temperature gradient of the medium will comprise a series of steps, with each step representing the temperature level established by the corresponding heater. To attain the maximum efficiency, it is important that each of such steps be set at a level substantially equal to the average temperature within the corresponding section of the sample. In the prior device the heaters are regulated in accordance with the reading of thermocouples that are positioned on the guard tube at points between the heaters. Consequently a reading from any one of the thermocouples reflects a balance between the temperature levels created by the two adjacent heaters. This balance can be reached by any number of combinations of heater settings, only one of which will provide the maximum efficiency. There is no way to determine the proper combination, and, therefore, the apparatus cannot be considered reliable.

In the present device, the heater controlling thermocouples are positioned within the guard tube and are aligned with an inner winding of each heater coil to thus reflect the temperature level established by a single heater. The temperature gradient within each sample is constant, and, therefore, by measuring the temperature at two spaced points within the samples, which can be accomplished by use of sample thermocouples, the temperature of any point in the sample can be calculated. It follows that the average temperature of any desired portion of the samples can be calculated and therefore the average temperature for each sample portion that corresponds with each heater can be determined and the respective heaters adjusted accordingly. Because of the reproducibility of these determinations, a chart can be provided which indicates the proper adjustment without separate calculations.

A further improvement of the present invention involves the positioning of the heater controlling thermocouples so as to measure the temperature of the medium immediately adjacent to the samples. This can be accomplished by mounting the thermocouples on the ends of finger-like supports that extend inwardly from the inner wall of the guard tube. In this way, the guard tube heaters can be set to generate the proper amount of heat which will establish a particular temperature within the portion of the medium that is adjacent the samples. This is important in that the temperature within the medium at any cross section is slightly greater at points adjacent the heater than at points adjacent the samples. The reason for this difference is that the heat within the medium tends to flow axially toward the direction of decreasing temperature, and thus, some of the heat which is directed laterally from the heater toward the portion of the medium adjacent the samples will be axially passed into the succeeding zone of medium which has a lower established temperature level. It will thus be understood that when the heater controlling thermocouple is positioned to gauge the temperature of the medium adjacent the guard tube as taught by the above mentioned publication, when the heater controlling thermocouple and the sample thermocouple are matched, the temperature of the medium immediately adjacent the sample will be lower than the corresponding sample temperature.

It is believed that there is a substantial industrial need for apparatus that will measure thermal conductivity more accurately than existing prior art apparatus is capable of. It is felt that the present invention establishes patentable novelty in teaching a construction that is capable of satisfying that need.

Further advantages and objects will become apparent from the following description in which:

FIGURE 1 is a sectional side view of a preferred embodiment of the invention;

FIGURE 2 is a side view of the guard tube of FIGURE 1;

FIGURE 3 is a side view of the guard tube shown in FIGURE 2 with the heaters removed therefrom.

FIGURE 1 illustrates a preferred embodiment of the present invention in which three abutting samples are aligned between heat source 4 and heat sink 5. Samples $N_1$ and $N_2$ have known thermal conductivity, and Sample U which is positioned between samples $N_1$ and $N_2$ has an unknown thermal conductivity. Each sample is provided with two thermocouples, T$a$ and T$b$, which are positioned in spaced relationship in the direction of alignment between the heat source and heat sink. The samples are enclosed in a cylindrical guard tube 6 and the space between the guard tube and the samples is filled with a low thermal conductivity powder 7. The guard tube is in turn enclosed in housing 8 and the space between the guard tube and housing is filled with insulating material.

As will be noted in FIGURE 3, the guard tube is provided with a continuous helical groove 9 having an approximate pitch of ½4 inch. Seven strands of wire representing heaters $H_1$ through $H_7$ are wound around the guard tube within groove 9 as illustrated in FIGURE 2. The heaters are arranged in juxtaposed relationship, with the adjacent end of each succeeding heater beginning immediately where the preceding heater ends to form an almost continuous heater coil within the groove, broken only to the extent needed to provide the necessary connections for individual control of each heater.

Finger-like supports 10 extend laterally from the inner wall of the guard tube to a position immediately adjacent to the samples. Thermocouples $T_1$ through $T_7$ are mounted on the ends of said supports 10 adjacent to the samples and are centrally aligned with the respective heaters $H_1$ through $H_7$. Control means is provided to individually control each heater and also to simultaneously control all of the heaters.

The housing may be made of stainless steel and the guard tube may be made of a suitable ceramic material such as alumina. For optimum results, the thermal conductivity of the medium which fills the space between the guard tube and the samples should be less than 10% of the thermal conductivity of the unknown sample, and the thermal conductivity of the known samples should be at least 90% of the thermal conductivity of the unknown samples. Where the thermal conductivity of the unknown is quite high, the thermal conductivity of the known samples is not as critical, and the percentage may be reduced to as much as 75% without materially affecting the results.

To reduce heat resistance between the abutting surfaces of the samples, a highly conductive foil such as platinum foil may be placed between the said surfaces and a force F applied to squeeze the samples together. The force should be sufficient to cause the foil to mold into the cracks and crevices in the abutting sample surfaces which otherwise can cause highly resistant air pockets. This force will normally be less than 100 p.s.i.

The samples can be of various shapes and sizes, however one inch diameter cylinders are preferred. The unknown sample should be about one inch thick and the known sample should be somewhat greater than one inch. The thermocouples in the unknown sample should be placed very close to its abutting ends. One of the thermocouples in each of the known samples should be placed very close to the end which abuts the unknown sample. The other thermocouples should be placed so that the thermocouples in the known samples have the same spacing as the thermocouples in the unknown sample. In that the known samples are thicker than the unknown sample, the outside thermocouples will be somewhat spaced from the ends abutting the heat sink and heat source, and thus it is less likely that the said thermocouples will be affected by any temperature disturbances that may be present in those interfaces.

In operation, a temperature drop is established between the heat source and heat sink. $N_1T_a$ is positioned directly in line with $T_1$ and therefore represents the average temperature in the portion of sample $N_1$ that corresponds with $H_1$. Thus $H_1$ is adjusted so that $N_1T_a$ and $T_1$ match. $T_2$ is exactly between $N_1T_a$ and $N_1T_b$. Therefore, $H_2$ is adjusted so that $T_2$ equals $$\frac{N_1T_a + N_1T_b}{2}$$

$T_3$ is exactly between $N_1T_b$ and $UT_a$. Therefore $H_3$ is adjusted so that $T_3$ equals $$\frac{N_1T_b + UT_a}{2}$$

$T_4$ is positioned between $UT_a$ and $UT_b$, $T_5$ is positioned between $UT_b$ and $N_2T_a$, $T_6$ is positioned between $N_2T_a$ and $N_2T_b$, and $T_7$ is positioned exactly in line with $N_2T_b$ and heaters $H_4$ through $H_7$ are adjusted accordingly. It will be noted that $$\frac{N_1T_b + UT_a}{2}$$

does not exactly represent the average temperature for the portions of the samples that correspond with heater $H_3$. This is also true of $$\frac{UT_b + N_2T_a}{2}$$

and $H_5$. However in that the thermal conductivity of $N_1$ and U are very close, the error will be very slight and for practical purposes not considered material.

When the sample thermocouples and the heater controlling thermocouples have been matched to within ±1° C., it is considered that a proper balance has been reached. The temperature drop between $T_a$ and $T_b$ of each sample is determined and the values are substituted into the following formula:

$$K_u = \frac{K_n A_n \Delta T_n \Delta L_u}{A_u \Delta T_u \Delta L_n}$$

Subscripts $n$ and $u$ represent the known and unknown samples respectively $K$ = thermal conductivity
$A$ = area of contact perpendicular to heat flow
$\Delta T$ = temperature drop across the samples in the direction of heat flow
$\Delta L$ = distance between thermocouples in the samples In the construction above described, $A_n = A_u$ and $\Delta L_n = \Delta L_u$, and therefore the formula is simplified to $$K_u = \frac{K_n \Delta T_n}{\Delta T_u}$$

This formula is solved first employing the temperature drop in $N_1$ and then the temperature drop in $N_2$. If the results are reasonably close, the test is considered suitably accurate.

Although a preferred embodiment of the invention has been described herein, it will be understood that various modifications and changes may be made in the construction shown without departing from the scope of the invention.

What is claimed is:

1. Apparatus for determining the thermal conductivity of a solid material by a comparative method, said apparatus comprising a housing, a guard tube mounted within said housing, a heat source mounted within said guard tube at one end thereof, and a heat sink mounted within said guard tube at the other end in spaced relation to said heat source, said spacing being adapted to receive at least two samples aligned between said heat source and heat sink, a plurality of heater wires individually controlled for independent adjustment of the heat generated thereby, helically wrapped around said guard tube to form tightly wound coils in juxtaposed relation to one another and separated by a spacing substantially equal to the spacing between the windings of the coils, means for determining the temperature drop within each positioned sample, means to measure the temperature of the medium which surrounds the samples at points centrally aligned with each heater.

2. An apparatus as defined in claim 1 wherein the means to measure the temperature of the medium comprises a series of thermocouples positioned on finger-like supports that extend inwardly from the inner wall of the guard tube.

3. Apparatus for determining the thermal conductivity of a solid material by a comparative method, said apparatus comprising a housing, a guard tube mounted within said housing, insulating material between the guard tube and the walls of the housing, a heat source mounted within said guard tube at one end thereof, a heat sink mounted within said guard tube at the other end in spaced relation to said heat source for receiving a pair of samples, one having a known and the other an unknown thermal conductivity and both being substantially smaller in transverse dimensions than said guard tube, positioned in alignment between the heat source and heat sink, low thermal conductivity material in the space between the samples and the guard tube, a plurality of heater wires helically wound around the guard tube in juxtaposed relationship, means to measure the temperature differential between fixed points on each sample, said points being spaced in the direction of alignment determined by the heat sink and heat source, and means to determine the temperature in the low thermal conductivity material at points centrally aligned with each heater coil.

4. An apparatus as defined by claim 3 wherein the guard tube is provided with a continuous helical groove in which the heater wires are positioned to thereby affix the position of the heater windings.

5. An apparatus as defined in claim 3 wherein the thermal conductivity of the known sample is at least 75% of the thermal conductivity of the unknown sample, and wherein the thermal conductivity of the material in the space between the samples and the guard tube is no more than 10% of the thermal conductivity of the unknown sample.

6. In an apparatus for determining the thermal conductivity of a solid material by a comparative method, a guard tube comprising an open ended cylindrical tube provided with at least one closely wound helical groove extending substantially over the entire outer wall thereof, a plurality of wires helically wound around said tube within said groove and arranged as a succession of heater coils wherein each succeeding coil begins immediately following the termination of a preceding coil, inwardly extending support means carried by the guard tube and thermocouples mounted on the support means and positioned to transversely align centrally with each coil.

References Cited by the Examiner

UNITED STATES PATENTS 3,043,128   7/1962   Ayers _____ 73—23.1

OTHER REFERENCES

Francl, J. et al.: "Thermal Conductivity: IV, Apparatus for Determining Thermal Conductivity by a Comparative Method." In The Journal of the American Ceramic Society. 37(2): pages 80–84, February 1954.

RICHARD C. QUEISSER, *Primary Examiner.*

J. C. GOLDSTEIN, *Assistant Examiner.*